J. W. BROWN.
METHOD OF QUICK GRAPHITIZATION OF CARBON ARTICLES.
APPLICATION FILED MAY 6, 1912.
1,133,259.
Patented Mar. 30, 1915.
2 SHEETS—SHEET 1.
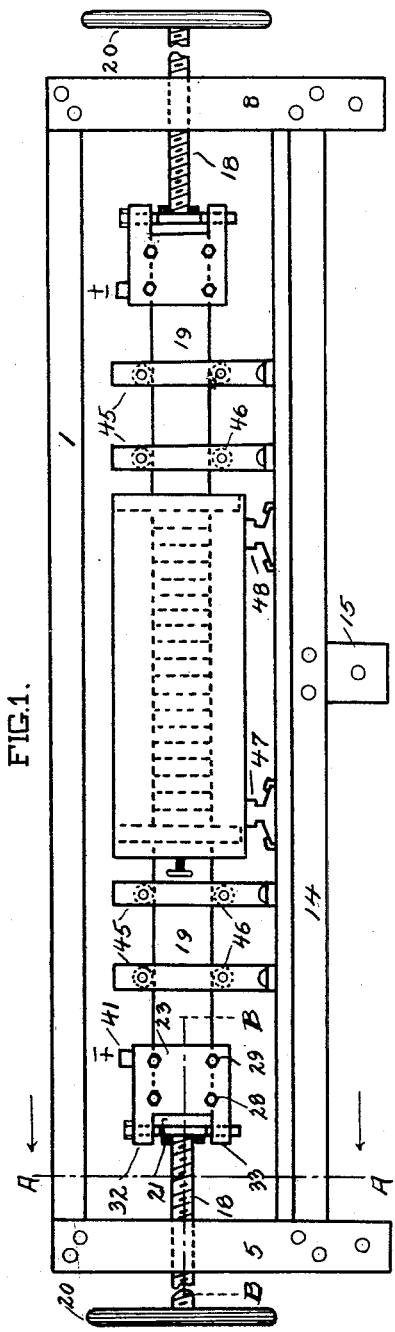
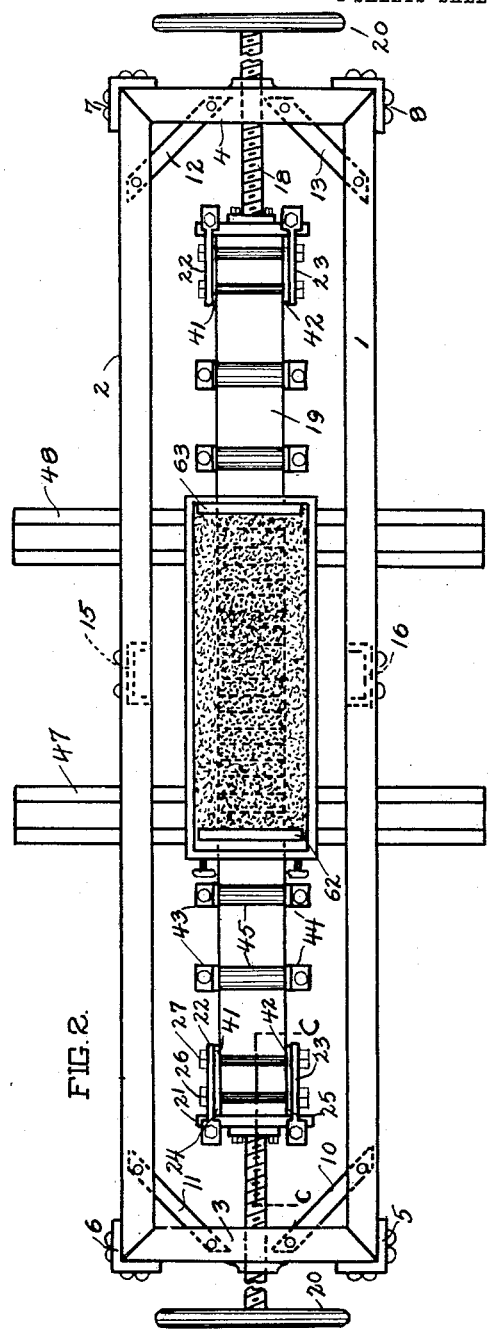
WITNESSES
INVENTOR
JOHN W. BROWN
BY
ATTORNEY J. W. BROWN.
METHOD OF QUICK GRAPHITIZATION OF CARBON ARTICLES.
APPLICATION FILED MAY 6, 1912.
1,133,259.
Patented Mar. 30, 1915.
2 SHEETS—SHEET 2.
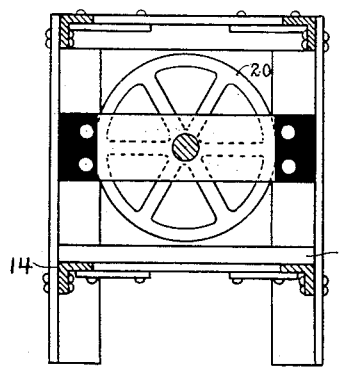
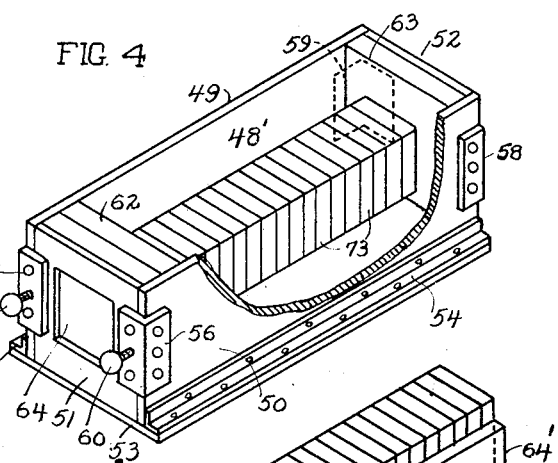
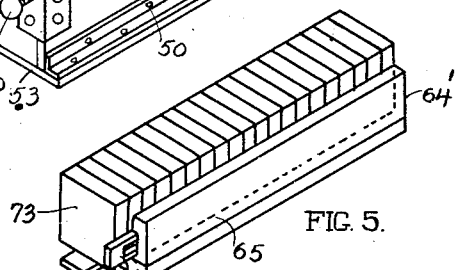
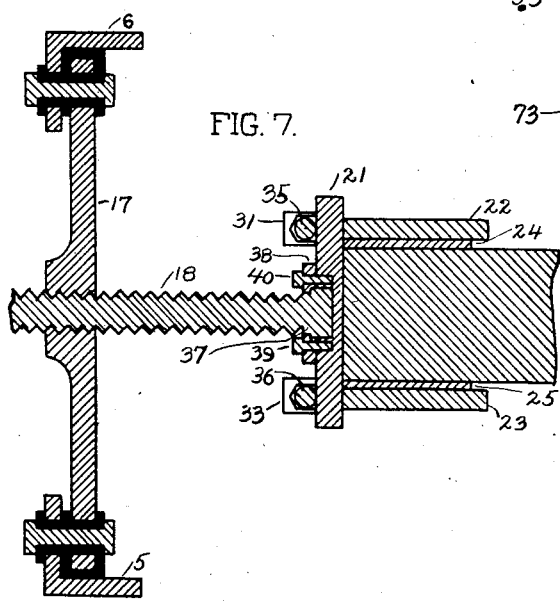
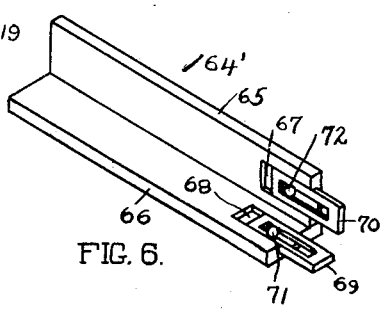
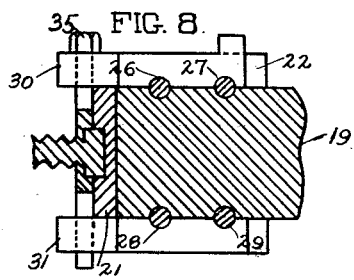
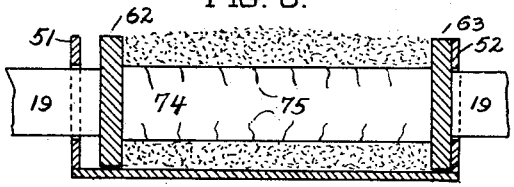
WITNESSES
INVENTOR
JOHN W. BROWN
BY
ATTORNEY

UNITED STATES PATENT OFFICE.

JOHN W. BROWN, OF LAKEWOOD, OHIO, ASSIGNOR TO NATIONAL CARBON COMPANY, OF CLEVELAND, OHIO, A CORPORATION OF NEW JERSEY.

METHOD OF QUICK GRAPHITIZATION OF CARBON ARTICLES.

1,133,259. Specification of Letters Patent. Patented Mar. 30, 1915.

Application filed May 6, 1912. Serial No. 695,354.

*To all whom it may concern:*

Be it known that I, JOHN W. BROWN, a resident of Lakewood, in the county of Cuyahoga, in the State of Ohio, have invented new and useful Improvements in the Method of Quick Graphitization of Carbon Articles, of which the following is a clear and exact description.

My invention relates to the graphitization of carbon articles by sending a current of very high density therethrough.

One object of my invention is to send through carbon articles a current of such high density that they will be quickly raised to the graphitization temperature so that there will be little loss of heat due to radiation.

Another object is to graphitize carbon articles without going through the slow, laborious and expensive process of packing them in large furnaces at present in use for this purpose.

The theory of graphitization as formerly advocated by some was that carbon could not be graphitized unless it was mixed with some impurity to act as a catalytic agent. It has, however, been proven that pure amorphous carbon can be very readily graphitized by the direct application of heat and in my process graphitization is brought about through heat alone, and not through any catalytic agents.

Before my invention was made, it was the usual practice to graphitize carbon articles such as brushes, electrodes, battery plates, etc., in large expensive furnaces. A layer of granular graphite or carbon was first placed on the bottom of the furnace, and then the articles were placed in columns so as to leave spaces between them. Granular graphite or carbon was then dumped into the furnace to fill the space between the columns and to cover the entire charge. After 10 to 48 hours the current was turned off and the furnace allowed to cool. The sides of the furnace had then to be torn down and the granular graphite removed before the articles could be removed. All this necessitated great labor and was very slow, expensive and inconvenient. Furthermore, carbon articles graphitized in this way were very often defective. For instance, brushes graphitized in this way very often split or partly split into sections or laminations. The number of defective articles in a charge sometimes ran as high as 75% of the entire charge. These, of course, were thrown away as scrap. In addition to this the carbon articles were not uniformly treated. Very large terminal electrodes were used for the furnace, and the current would be of unequal density in different parts of the furnace. If the resistance of one part of the furnace happened to be lower than another, and this is the usual state of affairs, then most of the current would traverse the lower resistance path, heating it up much more quickly and still further reducing the resistance. More and more current would thus be shunted from the colder parts of the furnace. It is obvious that it would be practically impossible to obtain a uniform product by this previous method.

In the old process the current density was so low that the length of time required for graphitizing the charge varied all the way from 10 hours to 48 hours. Inasmuch as the heat lost by radiation or conduction increases in proportion to the length of time the charge is heated, it will be apparent that the heat losses were great as compared to the losses in my process.

My process consists in lining up carbon articles between two electric terminals, pressing the articles together sufficiently to insure substantially uniform contact resistance between the various carbon articles. A current of high density is then passed through the articles and they are quickly brought to the graphitization temperature. By using a current density of 3000 amperes per square inch, I have reduced the time required for graphitization from two days by the old process down to 20 secs., and by using currents of still greater density the time of graphitization can be cut down to a very few seconds. This greatly decreased time for graphitization cuts down the heat losses until they are almost negligible.

My process not only greatly decreases the electric energy required to graphitize the articles, but it also decreases the expense of manipulation and the expense of the furnace itself. The articles are all equally heated and hence a uniform product is obtained.

The electrical equipment required to carry out my process is very small when compared with the equipment required for the old process. By my process I treat a few articles at a time and use a very much greater current density, but since the cross section of the conducting path is small the total current is not nearly so large as in the old process. It will be apparent that this amounts to a great saving in the electrical installment.

By using my process small orders can be taken care of at once. Carbon brushes, for instance, could be graphitized and be ready for shipment soon after the order was received. This would be out of the question if the old process were used.

My method can be carried out by various forms of apparatus. It is only essential that the articles be pressed against each other in good contact, or pressed together with a layer of powdered material between. However, I have illustrated an apparatus to carry out the method which I consider to be well suited for the purpose.

Referring to the drawings, Figure 1 is a side elevation of the apparatus which may be called a furnace, although it has no resemblance to the usual type of furnace. Fig. 2 is a top view of the same. Fig. 3 is a sectional view taken on line A—A of Fig. 1 looking in the direction indicated by the arrows. Fig. 4 is a view of the box containing the articles to be graphitized showing them clamped in place. Fig. 5 is a view of the device used to place the carbon articles in the box of Fig. 4. Fig. 6 is a view of the form shown in Fig. 5 before the articles are placed therein. Fig. 7 is a sectional view of parts of the furnace frame and electrode taken on the line B—B of Fig. 1. Fig. 8 is a sectional view of the part of the electrode taken on the line C—C of Fig. 2. Fig. 9 is a partial longitudinal section of the box with only one article to be graphitized.

Referring to Figs. 1 and 2, the furnace frame can be made of wood or any other material, though it has been shown as being made of angle irons. At the top there are two angle irons 1 and 2 joined to similar irons 3 and 4 at the ends. The angle irons may be joined together in any way, but I have shown them as being mitered so as to form a neat joint, and riveted or jointed to four posts 5, 6, 7, and 8. In order to make the frame more rigid the irons may be braced by the braces 10, 11, 12 and 13.

The lower frame, one member of which 14 is shown in Fig. 1, is identical in all respects to the upper frame. I have shown two metal supports 15 and 16 fastened to the lower frame at the middle. The legs or supports of the furnace may be bolted to posts or pillars, or they may be simply fastened to a table or floor as desired. The lower frame is preferably covered with a layer of some non-conducting substance 16' such as transite board, composed of asbestos and cement. Such material forms a very strong board and will answer well the purpose in this arrangement.

By referring to Figs. 3 and 7, it will be seen that the member 17 is joined to the corner posts 5 and 6, and insulated therefrom. The insulation may consist of fiber board or any other well known suitable non-conducting material. A screw 18 connected to the electrode 19 passes through the threaded opening in the member 17. The screw is revolved by any means, but I have shown a wheel 20 which is insulated therefrom in any way. A good way to do this is to construct the spokes of wood. The electrode may be joined in any manner to the screw 18. I have shown a metal end plate 21 which rests against the end of the electrode 19, and is held in place by two plates 22 and 23. In order to make good electrical connection with the electrode two copper plates 24 and 25 are clamped by the plates 22 and 23 against the electrode. The plates are held firmly by the bolts 26, 27, 28 and 29. Grooves are preferably cut in the edge of the electrode to admit of the passage of four clamping bolts. The clamping plates 22 and 23 have two ears each 30, 31 and 32, 33 which extend past the end of the electrodes sufficiently to enable pins 35 and 36 to be passed behind the plate 21 through holes in the ears of the plates.

The screw 18 has a circular head 37 bearing in a circular cavity in the plate 21. The plate 38, having a corresponding cavity and a hole for the passage therethrough of the screw 18, is fastened to the plate 21 by appropriate means such as a screw 39 and a screw 40. Lugs 41 and 42 on the copper plates 24 and 25 are provided so that conducting cables can be connected thereto. These are marked ± and ∓ on the drawings to indicate that they are the terminals. The electrode is held in place and properly guided by pairs of straps 43 and 44 joined together by pairs of rollers 45 and 46 above and below the electrode. The rollers permit of the electrode being moved back and forth by means of the operating wheel 20 with minimum friction. The straps are secured to the board 16' by appropriate screws or bolts. The rollers 45, 46 and the straps 43, 44 could be formed of iron, but since they would form a closed magnetic circuit around the electrode the hysteresis loss might be high enough to cause trouble. If either the straps or the rollers were made of non-magnetic material this trouble would be avoided. The trouble could also be obviated by using some material such as transite or fiber for this purpose.

The right hand side of the furnace in all its details is exactly identical with that of the left which has just been fully described so that it is unnecessary to allude to it in particular. The parts of the electrode and its connections are numbered similar to those on the right.

Two iron rails 47 and 48 are fastened to the board 16' to serve as supports for the box which contains the articles to be heated or graphitized.

The box shown in Fig. 4 consists of two sides 49 and 50 joined to two end pieces 51 and 52 and the bottom 53. These boards are preferably made of transite board or other materials that would serve the purpose equally as well. The box can be made stronger by means of angle irons 54 and 55 joined to the bottom and sides. End plates 56, 57, 58 and 59 may be fastened to the corners where the sides join the ends in order to further strengthen the box. The strengthening irons used on the box are not absolutely necessary, and in order not to render the showing confusing in Figs. 1 and 2 the box is there shown without them.

For a purpose to be later described two screws 60 and 61 are threaded through irons 56 and 57 and the member 51 to press against the conducting block 62. It is not necessary to have similar screws on the other end of the box, hence the conducting block 63 bears against the end member 52. The two end members 51 and 52 have openings therein to receive the two electrodes 19. The opening in the board 52 is not shown in Fig. 4, but it is identical with that in the end 51.

In order to facilitate the placing of the brushes in the box 48', a device 64' shown in Fig. 6 may be used. This consists of two boards 65 and 66 fastened together to form an angle. These boards may be made of any materials, but wood is most convenient. Two slots 67 and 68 in these boards receive members 69 and 70 in a loose fit. Screws or pins 71 and 72 pass through slots in the members 69 and 70, and hold them in place.

The use of the apparatus disclosed will now be given in detail. The articles to be heated or graphitized are shown as blocks 73. These are placed side by side in the angled form 64' as shown in Fig. 5. They are preferably placed with their short dimension in the direction of the device 64', though they may be placed with the other dimension in this direction. By referring to Fig. 5, it will be noted that the end block 73 extends past the boards 65 and 66, and is substantially flush with the ends of the members 69 and 70. The device 64' with the brushes therein are taken by the operator and placed in the box 48' and held so that the center line of the brushes is approximately in line with the center line of the blocks 62, 63, and then the screws 60 and 61 are manipulated forcing the block 62 against the column of carbon articles which clamps them firmly together against the block 63. The members 69 and 70 slide in the slots 67 and 68, and permit the carbon blocks to be clamped in place without clamping the device 64' at the same time. The latter is then removed by the operator.

If desired the box may be placed in the furnace and the current turned on without covering the articles with any heat insulating material. It is preferable, however, to fill the space in the box 48' by some heat insulating material and in practice I have found that broken pieces of charcoal serve the purpose well. A bag of broken charcoal can be emptied into the box 48' and it will flow into the space at the sides and below the carbon blocks 73. Sufficient charcoal should also be placed on top to cover well the carbon blocks.

The box 48' with the carbon articles and the heat insulating material is then placed by the operator on the rails 47 and 48 of the furnace and slid into place in proper alinement with the two electrodes 19. The wheels 20 are then manipulated to push the electrodes through the openings in the blocks 62, 63 to press them against the carbon articles and more firmly press them in contact with each other. The current is then turned on and in a short time the graphitization is complete. The electrodes are then drawn from the openings in the end plates of the box 48', and the box is removed and the contents dumped into a receptacle. Another box can have been filled by the one operator, or by others if more are needed, so that the furnace can be kept almost continually in operation.

While the use of the device 64' is very convenient in placing the carbon articles in place in the box 48', it is not necessary to use this scheme alone. The box could be filled up with a proper amount of charcoal and then the brushes could be placed in between the electrodes on top of the charcoal. I prefer, however, to use the device 64'.

The method is not restricted to graphitizing a plurality of articles. It can also be used to graphitize only one. I have shown this in Fig. 9. This figure is a partial section of the box 48' with one large article 74 pressed between the blocks 62, 63. If large bodies, such as electrodes are pressed through dies, they are liable to develop small separations indicated at 75. These are not always visible, but the separation may exist nevertheless, and when it is heated by the old process the separations will increase and cracks will be formed. But by applying pressure as in my process the development of cracks will be prevented.

The density of the current should not be the same in all cases. Small articles will stand a higher current density than will larger ones. If the density is too high in large articles such as large furnace electrodes, the sudden increase in temperature is liable to cause unequal strains which may disrupt the article. In general the higher the current density the more economical the process will be. I have found that if the current density be increased, the time required for graphitization decreases at a much greater rate. By using a current density of 3000 amperes per square inch I have graphitized carbon articles in 20 seconds.

Having described my invention what I claim is:

The method of graphitizing carbon articles which consists in placing them in a column with the surfaces of greatest area in adjacent articles in direct contact, applying pressure to said column and sending an electric current therethrough perpendicular to the contact surfaces.

In testimony whereof I have hereunto signed my name.

JOHN W. BROWN.

Witnesses:
F. D. LAWRENCE,
H. G. GROVER.